US011962505B1

(12) United States Patent
Kampeas et al.

(10) Patent No.: US 11,962,505 B1
(45) Date of Patent: *Apr. 16, 2024

(54) DISTRIBUTED DYNAMIC LOAD BALANCING IN NETWORK SYSTEMS

(71) Applicant: Marvell Israel (M.I.S.L) Ltd., Yokneam (IL)

(72) Inventors: Dor Joseph Kampeas, Ramat Gan (IL); Carmi Arad, Nofit (IL); Rami Zemach, Givat Shapira (IL); David Melman, Halutz (IL); Ronen Tausi, Raanana (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 590 days.

This patent is subject to a terminal disclaimer.

(21) Appl. No.: 17/158,939

(22) Filed: Jan. 26, 2021

Related U.S. Application Data

(63) Continuation of application No. 15/423,389, filed on Feb. 2, 2017, now Pat. No. 10,904,150.

(60) Provisional application No. 62/290,013, filed on Feb. 2, 2016.

(51) Int. Cl.
*H04L 47/125* (2022.01)
*H04L 45/12* (2022.01)
*H04L 45/24* (2022.01)

(52) U.S. Cl.
CPC .......... *H04L 47/125* (2013.01); *H04L 45/124* (2013.01); *H04L 45/24* (2013.01)

(58) Field of Classification Search
CPC ...... H04L 47/125; H04L 45/124; H04L 45/24
See application file for complete search history.

(56) References Cited

U.S. PATENT DOCUMENTS

| 5,032,987 | A | 7/1991 | Broder et al. |
| 5,896,380 | A | 4/1999 | Brown et al. |
| 6,035,107 | A | 3/2000 | Kuehlmann et al. |
| 6,249,521 | B1 | 6/2001 | Kerstein |

(Continued)

FOREIGN PATENT DOCUMENTS

WO    WO-99/07180 A2    2/1999

OTHER PUBLICATIONS

IEEE Std 802.1Q, 2003 Edition, "IEEE Standards for Local and Metropolitan area networks—Virtual Bridged Local Area Networks," *The Institute of Electrical and Electronics Engineers, Inc.*, 327 pages (May 7, 2003).

(Continued)

*Primary Examiner* — Kibrom T Hailu

(57) ABSTRACT

A source switching device in a switching system receives information measured by a target switching device in the switching system. The information is indicative of an amount of data received in a given amount of time by the target switching device via each of two or more first links coupled to the target switching device. The source switching device determines, based at least in part on the information received from the target device, a path, from among multiple paths from the source switching device to the target switching device, for transmission of a packet flow directed to the target switching device. The source switching device transmits, via the determined path for transmission of the packet flow to the target device, one or more packets belonging to the packet flow.

18 Claims, 3 Drawing Sheets

(56) References Cited

U.S. PATENT DOCUMENTS

| | | |
|---|---|---|
| 6,363,396 B1 | 3/2002 | Klots et al. |
| 6,426,947 B1 | 7/2002 | Banker et al. |
| 6,430,170 B1 | 8/2002 | Saints et al. |
| 6,535,530 B1 | 3/2003 | Matsui |
| 6,614,758 B2 | 9/2003 | Wong et al. |
| 6,735,670 B1 | 5/2004 | Bronstein et al. |
| 6,757,742 B1 | 6/2004 | Viswanath |
| 6,807,179 B1 | 10/2004 | Kanuri et al. |
| 6,813,268 B1 | 11/2004 | Kalkunte et al. |
| 6,874,039 B2 | 3/2005 | Ganapathy et al. |
| 6,973,082 B2 | 12/2005 | Devi et al. |
| 7,111,162 B1 | 9/2006 | Bagepalli et al. |
| 7,190,696 B1 | 3/2007 | Manur et al. |
| 7,224,845 B1 | 5/2007 | Russo et al. |
| 7,280,527 B2 | 10/2007 | Basso et al. |
| 7,346,706 B2 | 3/2008 | Rezaaifar et al. |
| 7,362,750 B2 | 4/2008 | Choi et al. |
| 7,424,016 B2 | 9/2008 | Sweeney et al. |
| 7,424,019 B1 | 9/2008 | Kopelman et al. |
| 7,443,790 B2 | 10/2008 | Aicklen et al. |
| 7,496,033 B2 | 2/2009 | Best et al. |
| 7,539,750 B1 | 5/2009 | Parker et al. |
| 7,554,914 B1 | 6/2009 | Li et al. |
| 7,567,567 B2 | 7/2009 | Muller et al. |
| 7,580,417 B2 | 8/2009 | Ervin et al. |
| 7,613,209 B1 | 11/2009 | Nguyen et al. |
| 7,623,455 B2 | 11/2009 | Hilla et al. |
| 7,636,319 B2 | 12/2009 | Shankar et al. |
| 7,639,614 B2 | 12/2009 | Nakagawa et al. |
| 7,643,427 B2 | 1/2010 | Kokku et al. |
| 7,796,594 B2 | 9/2010 | Melman et al. |
| 7,817,627 B2 | 10/2010 | Beshai |
| 7,821,925 B2 | 10/2010 | Davies |
| 7,821,931 B2 | 10/2010 | Swenson et al. |
| 7,881,221 B2 | 2/2011 | Arad et al. |
| 7,898,959 B1 | 3/2011 | Arad |
| 7,924,860 B1 | 4/2011 | Frailong et al. |
| 7,941,637 B2 | 5/2011 | Pelley, III et al. |
| 7,969,880 B2 | 6/2011 | Yano et al. |
| 7,970,961 B2 | 6/2011 | Ganapathy et al. |
| 7,979,671 B2 | 7/2011 | Aviles |
| 8,004,990 B1 | 8/2011 | Callon |
| 8,090,913 B2 | 1/2012 | Pelley, III et al. |
| 8,130,754 B2 | 3/2012 | Binkert et al. |
| 8,213,420 B2 | 7/2012 | Donoghue et al. |
| 8,218,553 B2 | 7/2012 | Kompella |
| 8,238,250 B2 | 8/2012 | Fung |
| 8,243,594 B1 | 8/2012 | Fotedar et al. |
| 8,244,909 B1 | 8/2012 | Hanson et al. |
| 8,250,399 B1 | 8/2012 | Mizrahi et al. |
| 8,274,971 B2 | 9/2012 | Battle et al. |
| 8,279,871 B1 | 10/2012 | Sivan et al. |
| 8,339,951 B2 | 12/2012 | Scaglione |
| 8,355,328 B2 | 1/2013 | Matthews et al. |
| 8,358,651 B1 | 1/2013 | Kadosh et al. |
| 8,364,711 B2 | 1/2013 | Wilkins et al. |
| 8,401,043 B1 | 3/2013 | Kadosh et al. |
| 8,422,508 B2 | 4/2013 | Beshai |
| 8,503,456 B2 | 8/2013 | Matthews et al. |
| 8,532,099 B2 | 9/2013 | Kreeger et al. |
| 8,547,971 B1 | 10/2013 | Mizrahi |
| 8,553,582 B1 | 10/2013 | Mizrahi et al. |
| 8,578,097 B2 | 11/2013 | Kim et al. |
| 8,587,674 B2 | 11/2013 | Iwata |
| 8,614,950 B2 | 12/2013 | Roitshtein et al. |
| 8,625,594 B2 | 1/2014 | Safrai et al. |
| 8,660,005 B2 | 2/2014 | Roitshtein et al. |
| 8,683,061 B2 | 3/2014 | Sitaraman et al. |
| 8,756,424 B2 | 6/2014 | Roitshtein et al. |
| 8,792,497 B2 | 7/2014 | Rajagopalan et al. |
| 8,848,728 B1 | 9/2014 | Revah et al. |
| 8,948,193 B2 | 2/2015 | Perlmutter et al. |
| 9,154,444 B1 | 10/2015 | Mizrahi |
| 9,166,916 B1 | 10/2015 | Mizrahi et al. |
| 9,455,967 B2 | 9/2016 | Roitshtein et al. |
| 10,904,150 B1 * | 1/2021 | Kampeas .............. H04L 45/124 |
| 2002/0087716 A1 | 7/2002 | Mustafa |
| 2002/0093952 A1 | 7/2002 | Gonda |
| 2003/0043825 A1 | 3/2003 | Magnussen et al. |
| 2003/0081599 A1 | 5/2003 | Wu et al. |
| 2003/0147385 A1 | 8/2003 | Montalvo et al. |
| 2003/0210688 A1 | 11/2003 | Basso et al. |
| 2003/0235168 A1 | 12/2003 | Sharma et al. |
| 2004/0015582 A1 | 1/2004 | Pruthi |
| 2004/0073640 A1 | 4/2004 | Martin et al. |
| 2005/0083936 A1 | 4/2005 | Ma |
| 2005/0213582 A1 | 9/2005 | Wakumoto et al. |
| 2006/0147208 A1 | 7/2006 | Aicklen et al. |
| 2006/0245423 A1 | 11/2006 | Best et al. |
| 2006/0251109 A1 | 11/2006 | Muller et al. |
| 2006/0291392 A1 | 12/2006 | Alicherry et al. |
| 2007/0168531 A1 | 7/2007 | Sitaraman et al. |
| 2007/0280258 A1 | 12/2007 | Rajagopalan et al. |
| 2008/0031263 A1 | 2/2008 | Ervin et al. |
| 2008/0037531 A1 | 2/2008 | Donoghue et al. |
| 2008/0037544 A1 | 2/2008 | Yano et al. |
| 2008/0049774 A1 | 2/2008 | Swenson et al. |
| 2008/0052488 A1 | 2/2008 | Fritz et al. |
| 2008/0084881 A1 | 4/2008 | Dharwadkar et al. |
| 2008/0114887 A1 | 5/2008 | Bryers et al. |
| 2008/0123525 A1 | 5/2008 | Miyoshi et al. |
| 2008/0159309 A1 | 7/2008 | Sultan et al. |
| 2008/0181103 A1 | 7/2008 | Davies |
| 2008/0205655 A1 | 8/2008 | Wilkins et al. |
| 2008/0225853 A1 | 9/2008 | Melman et al. |
| 2008/0315985 A1 | 12/2008 | Johnsen et al. |
| 2009/0003204 A1 | 1/2009 | Okholm et al. |
| 2009/0196303 A1 | 8/2009 | Battle et al. |
| 2009/0259825 A1 | 10/2009 | Pelley, III et al. |
| 2009/0274154 A1 | 11/2009 | Kopelman et al. |
| 2010/0023726 A1 | 1/2010 | Aviles |
| 2010/0046537 A1 | 2/2010 | Perlmutter et al. |
| 2010/0098104 A1 | 4/2010 | Marshall |
| 2010/0142398 A1 | 6/2010 | Arad et al. |
| 2010/0142410 A1 | 6/2010 | Huynh Van et al. |
| 2010/0214913 A1 | 8/2010 | Kompella |
| 2011/0007741 A1 | 1/2011 | Kreeger et al. |
| 2011/0013627 A1 | 1/2011 | Matthews et al. |
| 2011/0013638 A1 | 1/2011 | Matthews et al. |
| 2011/0013639 A1 | 1/2011 | Matthews et al. |
| 2011/0026541 A1 | 2/2011 | Beshai |
| 2011/0093660 A1 | 4/2011 | Pelley, III et al. |
| 2011/0102612 A1 | 5/2011 | Iwata |
| 2011/0134925 A1 | 6/2011 | Safrai et al. |
| 2011/0164616 A1 | 7/2011 | Kloth et al. |
| 2011/0295894 A1 | 12/2011 | Yoo |
| 2011/0296411 A1 | 12/2011 | Tang et al. |
| 2012/0042121 A1 | 2/2012 | Kim et al. |
| 2012/0136846 A1 | 5/2012 | Song et al. |
| 2013/0013880 A1 | 1/2013 | Tashiro et al. |
| 2014/0016470 A1 | 1/2014 | Li |
| 2014/0093073 A1 | 4/2014 | Horgan et al. |
| 2014/0115167 A1 | 4/2014 | Roitshtein et al. |
| 2014/0160934 A1 | 6/2014 | Roitshtein et al. |
| 2014/0301394 A1 | 10/2014 | Arad et al. |
| 2014/0325228 A1 | 10/2014 | Roitshtein et al. |

OTHER PUBLICATIONS

IEEE Std 802.1Q—2011 (Revision of IEEE Std.802.1Q-2005), "IEEE Standard for Local and Metropolitan Area Networks—Media Access Control (MAC) Bridges and Virtual Bridged Local Area Networks," The Institute of Electrical and Electronics Engineers, Inc., 1,365 pages (Aug. 31, 2011).

IEEE P802.1aq/D4.6, Draft Amendment to IEEE Std 802.1Q-2011, "IEEE Draft Standard for Local and Metropolitan Area Networks—Media Access Control (MAC) Bridges and Virtual Bridged Local Area Networks—Amendment XX: Shortest Path Bridging," *The Institute of Electrical and Electronics Engineers, Inc.*, 363 pages (Feb. 10, 2012).

IEEE P802.1ad/D6.0, Draft Amendment to IEEE Std 802.1Q, "IEEE Draft Standard for Local and Metropolitan Area Networks—

(56) References Cited

OTHER PUBLICATIONS

Virtual Bridged Local Area Networks—Amendment 4: Provider Bridges," *The Institute of Electrical and Electronics Engineers, Inc.*, 60 pages, (Aug. 17, 2005).
Raoof, K., Prayongpun, N., Impact of Depolarization Effects on MIMO Polarized Wireless Configuration, Wireless Communications, Networking and Mobile Computing, 2007. WiCom 2007, pp. 1-4 (Sep. 2007).
Jaramillo, et al., "Padded Frames: A Novel Algorithm for Stable Scheduling in Load-Balanced Switches," 40th Annual Conference on Information Sciences and Systems, pp. 1732-1737, Mar. 2006.
IEEE Std 802.3-2002, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, 379 pages (Mar. 8, 2002).
IEEE Std 802.3-2005, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, Sections 1-5 (Dec. 9, 2005).
IEEE Draft P802.3ae/D5.0 Supplement to Carrier Sense Multiple Access with Collision Detection (CSMA/CD) Access Method & Physical Layer Specifications—Media Access Control (MAC) Parameters, Physical Layer, and Management Parameters for 10 GB/s Operation *The Institute of Electrical and Electronics Engineers, Inc.*, 540 pages (May 1, 2002).
Chen, "Home Network Basis: Transmission Environments and Wired/Wireless Protocols," Prentice Hall, 26 pages (Jul. 2003).

\* cited by examiner

DISTRIBUTED DYNAMIC LOAD BALANCING IN NETWORK SYSTEMS

CROSS-REFERENCE TO RELATED APPLICATION

This application is a continuation of U.S. patent application Ser. No. 15/423,389, filed on Feb. 2, 2017, entitled "Distributed Dynamic Load Balancing in Network Systems," now U.S. Pat. No. 10,904,150, which claims the benefit of U.S. Provisional Patent Application No. 62/290,013, entitled "Distributed Dynamic Load Balancing in Network Systems," which was filed on Feb. 2, 2016. Both of the applications referenced above are hereby incorporated by reference in their entireties.

FIELD OF THE DISCLOSURE

The present disclosure relates generally to communication networks and, more particularly, to load balancing in network systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some networking applications require switching between a high number of ports. For example, a typical data center includes a large number of servers, and switches to interconnect the servers and to communicatively couple the servers to outside network connections, such as backbone network links. In such applications, switching systems capable of switching between a high number of ports are utilized so that traffic can be forwarded between a backbone network line and a large number of servers and/or between each server and a large number of other servers. Such switching systems can include a large number of switches, and each switch typically is capable of switching between several ports. In data centers and server farms, multiple layers of switches are often utilized to enable forwarding packets between each server and a backbone network link and/or between each server and a large number of other servers. For example, a first layer of switches typically provides ports to which servers and network links are connected. A second layer of switches typically interconnects the first layer of switches. In such switching systems it is important to balance traffic load among multiple links that are available between switches in the first layer.

SUMMARY

In an embodiment, a method for balancing traffic load in a switching system includes receiving, at a source switching device, information measured by a target switching device, the information indicative of an amount of data received in a given amount of time by the target switching device via each of two or more first links coupled to the target switching device. The method also includes determining, by the source switching device, a path from among multiple paths from the source switching device to the target switching device, the path for transmission of a packet flow directed to the target switching device, including determining the path based at least in part on the information that is indicative of an amount of data received by the target switching device, the information being received from the target switching device. The method additionally includes transmitting, by the source switching device, one or more packets belonging to the packet flow, the packet being transmitted via the determined path for transmission of the packet flow to the target device.

In another embodiment, a source switching device comprises a plurality of ports to couple the source switching device to respective links in a switching system. The source switching device also comprises a load balancer device configured to receive information measured by a target switching device, the information indicative of an amount of data received in a given amount of time by the target switching device via each of two or more first links coupled to the target switching device, and determine a path from among multiple paths from the source switching device to the target switching device, the path for transmission of a packet flow directed to the target switching device, including determining the path based at least in part on the information received from the target switching device. The source device additionally includes a packet processor device configured to transmit one or more packets belonging to the packet flow, the packet being transmitted via a port of the plurality of ports, the port corresponding to the determined path for transmission of the packet flow to the target device.

DETAILED DESCRIPTION

Embodiments are described herein in the context of load balancing traffic in a multi-rooted tree topology of switching or routing devices in a data center. It is noted however, in light of the disclosure and teachings herein, that similar methods and apparatus for load balancing can be employed in other suitable systems in which multiple links or paths are available for forwarding traffic in a network. The described load balancing methodologies are not limited to use in multi-rooted data center topologies, but rather may be utilized in other suitable contexts as well.

Figure 1:
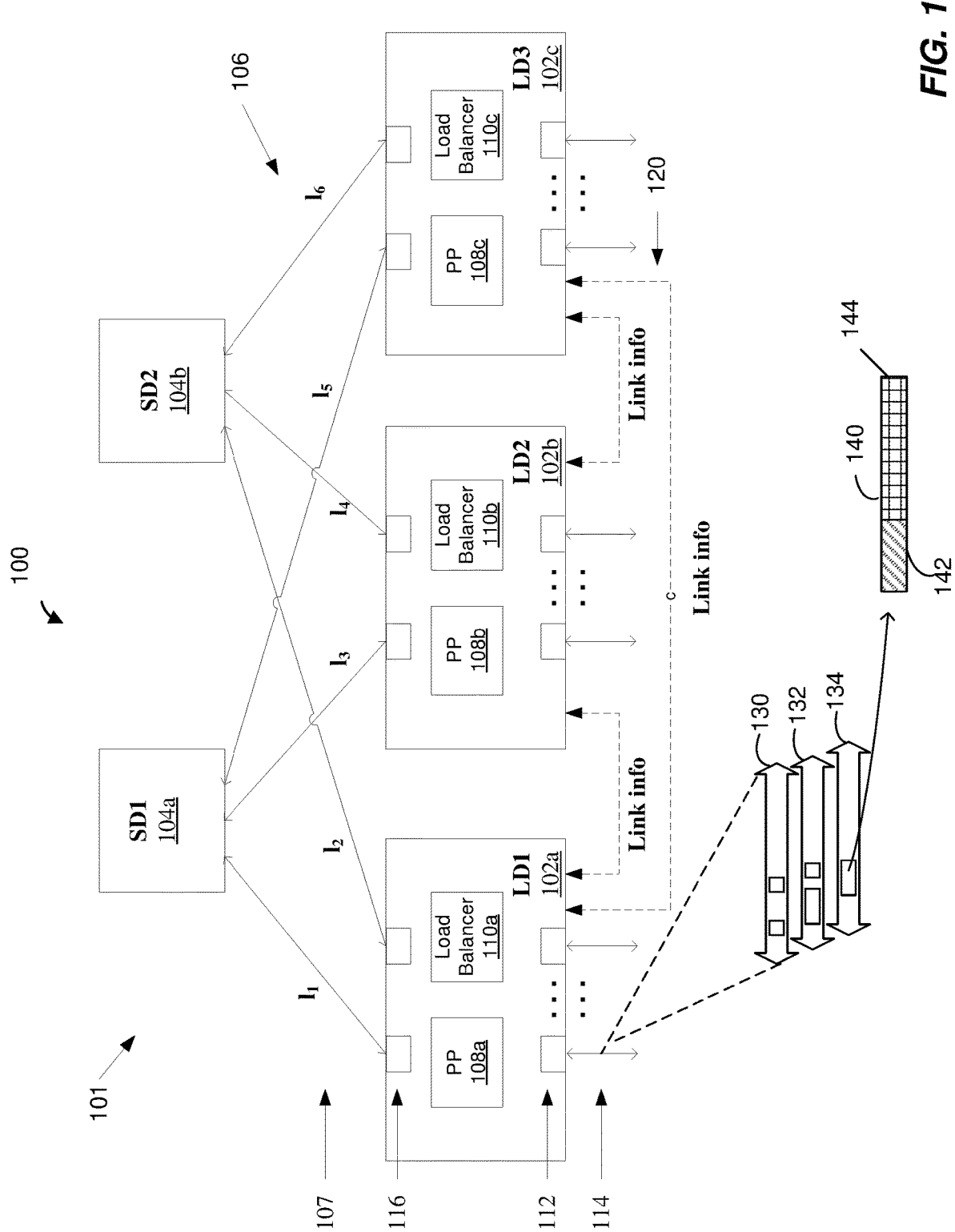
FIG. 1 is a block diagram of an example switching system in which switching devices apply load balancing techniques to efficiently forward traffic over multiple available paths, according to an embodiment.

FIG. 1 is a block diagram of an example network system 100 that utilizes load balancing techniques to efficiently forward traffic over multiple available paths between network devices, according to an embodiment. The network system 100 is suitable for use in data centers, server farms, or any systems that require switching or routing between a large number of ports, in an embodiment. The network system 100 includes a plurality of network devices 101. In the embodiment of FIG. 1, the network devices 101 are arranged in a multi-rooted tree topology. In this topology, the network devices 101 include a plurality of first-stage switching devices 102, also referred to herein as "leaf devices or LD" and a plurality of second stage switching devices 104, also referred to herein as "spine devices of SD." The leaf devices 102 and the spine devices 104 are interconnected via an interconnect network 106 having a plurality of links 107 $l_1$-$l_6$. In an embodiment, the interconnect network 106 connects each leaf device 102 to each spine device 104. In an embodiment, the interconnect network 106 is a CLOS network. In another embodiment, the interconnect network 106 is a suitable type of network different from a CLOS network. In an embodiment, the network 106 connects each leaf device 102 to each spine device 104 via a respective one of links 107. Similarly, the network 106 connects each spine device 104 to each leaf device 102 via a respective one of links 107, in an embodiment.

In an embodiment, each leaf device 102 includes a plurality of downlink ports 112 for coupling the leaf device 102 to networks, devices in the networks, servers, storage device, or other host systems or devices between which network packets are forwarded in the network system 100. Each leaf device 102 also includes a plurality of uplink ports 116 for coupling the leaf device 102 to spine devices 104 via the links 107. Although in the embodiment of FIG. 1, merely for explanatory purposes, the network system 100 includes three leaf devices 102 and two spine devices 104, in other embodiment, the network system 100 includes other suitable numbers of leaf devices 102 and/or other suitable numbers of spine devices 104. In an embodiment, the number of leaf devices 102 and the number of spine devices 104 are generally determined by system requirements. For example, generally, the number of paths available for transmission of data between any two leaf devices 102 is equal to the number of spine devices 104, in an embodiment. Accordingly, the number of spine device 104 in the network 100 may be selected according to bandwidth requirements for transmission of data between the leaf devices 102, in an embodiment. The number of leaf devices 102 in the network 100, on the other hand, is determined by a number of downlink ports needed by the network system 100 for connecting to networks, devices in the networks, servers, storage device, or other host systems or devices, etc., in an embodiment.

With continued reference to FIG. 1, ones of leaf devices 102 respectively include a packet processor 108 and a load balancer 110, in an embodiment. In operation, when a data unit such as a packet or a frame (hereinafter referred to as "packet" merely for ease of explanation and brevity) is received at a leaf device 102 (also referred to herein as a source leaf device), the packet processor 108 of the leaf device 102 forwards the packet to one of the spine devices 104. Then, the spine device 104 forwards the packet to a destination leaf device 102 (also referred to herein as a target leaf device) to which the packet is directed. Each leaf device 102 can be a source leaf device in some situations and a target leaf device in other situations, in an embodiment. The packet is then transmitted towards its destination by the destination leaf device 102. Because each leaf device 102 is connected to each of the spine devices 104, and each spine device 104 is connected to each of the leaf devices 102, a packet received at a source leaf device 102 can reach its destination leaf device 102 by egressing the source leaf device 102 via any uplink port 116 of the source leaf device 102, and accordingly, by traveling to the destination leaf device 102 via any of the spine devices 104. Thus, multiple paths are available for transmission of a packet from a source leaf device 102 to a destination leaf device 102. As just an example, a packet received at the leaf device LD1 102a that is directed to the leaf device LD2 102b (or, ultimately, to a device or a network coupled to a downlink port 112 of the leaf device LD2 102b) can reach the leaf device LD2 102b by either (i) traveling from the leaf device LD1 102a via the link $l_1$ to the spine device SD1 104a, and then from the spine device SD1 104a via the link $l_3$ to the leaf device LD2 102b or (ii) traveling from the leaf device LD1 102a via the link $l_2$ to the spine device SD2 104b, and then from the spine device SD2 104b via the link $l_4$ to the leaf device LD2 102b.

In an embodiment, leaf devices 102 are configured to process data flows (also referred to herein as "packet flows" or simply "flows"), such as a data flow of packets received from a source device (e.g., a host device such as a server) coupled to a source leaf device 102 and transmitted to a destination device (e.g., another host device such as another server) coupled to a destination leaf device 102. Several example data flows 130-134 processed by the leaf devices 102 in some embodiments are described in more detain below. Generally, packets belonging to a data flow should be transmitted via a same path between the source leaf device 102 and the destination leaf device 102 to ensure than the order of packets in the data flow is maintained in transmission of the packets from the source and destination leaf devices 102, in an embodiment. [Thus, in an embodiment, a packet processor 108 of a leaf device 102 generally forwards packets that belong to a same data flow via a same link 107 such that the packets are transmitted to their destination leaf device 102 via a same spine device 104. For example, the packet processor 108 of respective leaf devices 102 forwards packets using a forwarding table or a flow table (not shown in FIG. 1) that associates data flows with ports, links and/or paths via which packets should be transmitted from the leaf device 102. In an embodiment, when the leaf device 102 receives a packet, the packet processor 108 accesses the flow table using information that identifies a data flow of the packet to identify the port, link or path via which to transmit the packet. In an embodiment, the packet processors 108 are implemented in hardware and operate in a data plane at a sufficiently high data rate such that packets are transmitted from the leaf devices 102 with little or no delay experienced by the packets in the leaf devices 102.

In an embodiment, the load balancer 110 of each leaf device 102 utilizes global congestion-aware load balancing techniques described herein to efficiently load-balance data flows being processed by the leaf device 102 among multiple paths available for transmission of the data flows from the leaf devices 102. To this end, in an embodiment, each leaf device 102 maintains information indicative of an amount of data received via each link 107 coupled to the leaf device 102. In an embodiment, the information indicative of the amount of data received via a link 107 by a leaf device 102 indicates a number of packets or a number of bytes received via the link 107 in a given amount of time, for example. A respective leaf device 102 periodically provides information indicative of the amount of data received via a respective link 107 coupled to the leaf device 102, in an embodiment. In an embodiment, a leaf device 102 provides the information indicative of the measured amount of data received via each link 107 coupled to the leaf device 102 by periodically transmitting a respective control message 120 to each other leaf device 102, where the control messages include the information indicative of the measured amount of received data by the leaf device 102. In an embodiment, a respective leaf device 102 periodically transmits a respective control message 120 directly to other leaf devices 102. In another embodiment, leaf devices 102 periodically transmit respective control messages 120 to other leaf devices 102 via links 107 and spine devices 104.

Based at least in part on the information indicative of the amount of data received via respective links 107 by other leaf devices 102, the load balancer 110 of each leaf device 102 periodically determines whether data flows currently being processed by the leaf device 102 should be rebalanced by redirecting one or more data flows from paths currently used for transmission of the data flows to the alternative paths available for transmission of the data flows. As will be explained in more detail below, in an embodiment, the traffic balancer 110 of a leaf device 102 (e.g., leaf device 102a) determines, based on (i) the information indicative of amount of data received by the other leaf devices 102 (e.g., 102b and 102c) via respective links 107 coupled to the other leaf devices 102, (ii) information indicative of amount of data transmitted by the leaf device 102a on respective links 107 coupled to the leaf device 102, and (iii) sizes (e.g., bandwidths of flows as measured by amount of data corresponding to the flow received in a given amount of time such as packets per second, bytes per second, etc.) of flows being processed by the leaf device 102a, whether one or more data flows should be moved to other links 107. For example, in an embodiment, the load balancer 110 calculates, based on (i)-(iii), a set of share metrics with respective ones of the share metrics indicating shares of data flows on respective paths available for transmission of the data flows with respect to all data flows being transmitted using links 107 included in the respective paths. The load balancer 100 then determines based on the set of share metrics that one or more data flows should be redirected from paths currently being used for transmission of the one or more data flows to new paths on which the one or more data flows will have greater shares as compared to shares of the data flows on the paths currently being used for transmission of the data flows. When the load balancer 110 determines that one or more data flows should be redirected from paths currently used for transmission of the data flows, the load balancer 110 causes the packet processor 108 of the leaf device 102 to begin routing packets belonging to the one or more data flows via the new paths. For example, the load balancer 110 updates the flow table used by the packet processor 108 to associate the one or more data flows with the corresponding new ports, links and/or paths via which packets belonging to the one or more data flows should now be transmitted from the leaf device 102.

In an embodiment, such distribution of data flows among available links 107 achieves or at least approaches a min-max fair solution (at least when the distribution is at an equilibrium), in which a data flow is redirected to a new path if and only if moving of the data flow to the new path would increase share of the flow in the path at a cost of a decrease of another, larger flow, in the path. A min-max fair solution leads to a more stable equilibrium, in an embodiment, as compared to systems that utilize other methods for rebalancing data flows among multiple available links, such as systems that rebalance based on measures of link capacity. Moreover, convergence to equilibrium is achieved more quickly as compared, for example, to systems in which link capacity measures are used.

In an embodiment, to ensure that packets in a flow do not get reordered due to the flow being redirected to a new path, the packet processor 108 detects gaps in packets of flows, and redirects a flow only when a sufficiently large gap is detected in the flow. That is, in an embodiment, when the packet processor 108 makes a determination to redirect a flow, the flow is actually redirected only if and when a sufficiently large gap is detected between consecutive packets in the flow, in this embodiment. A burst of packets with a sufficiently large gap between a last packet of the burst and a first packet of the next burst is sometimes referred to herein as flowlet. In an embodiment, when the packet processor 108 redirects a flow to a new path, the packet processor 108 begins transmission of the flow on the new path with the first packet of a flowlet following a detected gap in the packet flow.

In an embodiment, the packet processor 108 of a leaf device 102 is implemented in hardware (e.g., using one or more integrated circuits) and operate at a suitable high rate to forward packets while introducing no or minimal delay in transmission of the packets. The load balancer 110 of the leaf device 102, on the other hand, is implemented in firmware and/or software and generally operates at a slower rate to rebalance data flows being transmitted by the leaf device 102, in an embodiment.

Referring still to FIG. 1, a link 114 coupled to a downlink port 112 of a leaf device 102 carries one or more data flows 130, 132, 134. Typically but not necessarily, each of the data flows 130, 132, 134 is a bidirectional flow including data traveling to the leaf device 102, or inbound data, and data traveling from the leaf device 102, or outbound data. The other links 114 also carry one or several data flows, such as data flows 130, 132, 134, in an embodiment. Some of the data flows 130, 132, 134 are associated with more than one of the links 114, in an embodiment. In some embodiments and/or scenarios, the data flows 130, 132, 134 are associated with different communication protocols such as Transmission Control Protocol (TCP) layered over Internet Protocol (IP) (hereinafter, "TCP/IP"), User Datagram Protocol (UDP) layered over IP (hereinafter, "UDP/IP"), File Transfer Protocol (FTP), Hypertext Transfer Protocol (HTTP), etc. For example, the data flow 130 corresponds to FTP, the data flow 132 corresponds to Telnet, and the data flow 134 corresponds to HTTP, in one scenario. Further, some of the data flows 130-314 correspond to different sessions associated with the same communication protocol, in some scenarios. A typical network link also includes Simple Mail Transfer Protocol (SMTP), Structured Query Language (SQL), and several additional data flows associated with e-mailing, web browsing, database applications, remote login, and other application types.

In some scenarios, the data flows 130, 132, 134 respectively define a flow aggregate (FA) that includes multiple streams, sessions, or connections corresponding to various communication protocol layers. For ease of explanation, the term "flow" is used herein interchangeably to mean either a flow that includes a single stream, session or connection or a flow aggregate that includes multiple streams, sessions, or connections. The data flows 130, 132, 134 vary in bandwidth, in some embodiments and scenarios. For example, the data flow 130 is a relatively small bandwidth short-lived flow, such as a flow associated with transmission of an email message or flow associated with a web browser search, in an embodiment. On the other hand, the data flow 132 is a relatively large bandwidth long-lived flow, such as a flow associated with transfer of data, in an example embodiment and scenario. The relatively short-lived flows are sometimes referred to herein as "mouse flows," and the relatively long-lived flows are sometimes referred to herein as "elephant flows."

It is noted that some protocols, such as TCP, are connection-oriented while others, such as UDP, are connectionless. In one example scenario, a first host device (e.g., a first server coupled to a first downlink port 112) connects to a second host device (e.g., a second server coupled to a second downlink port 112) by establishing a TCP connection having a particular address and port combination on both ends. This connection is identifiable by the TCP header specifying, in part, the address of the outside host, the address of the local host, the port on the outside host, and the port on the local host. An individual TCP/IP packet carries a certain quantum or chunk of information associated with the same connection, or communication session. On the other hand, in another example scenario, a pair of hosts uses the UDP protocol to exchange individual messages, or datagrams, without establishing a connection. Thus, in some scenarios, each of the data flows 130, 132, 134 includes one or more streams such as TCP streams including multiple packets associated with a single data exchange or single packets conveying individual messages in their entirety. In the examples discussed below, a data stream generally refers to a unidirectional or bidirectional data exchange between two or more hosts including one or more packets such as data packets or frames.

With continued reference to FIG. 1, an example data packet 140 in the flow 134 includes a header 142 and a payload 144. In general, the header 142 corresponds to one or more layers of a protocol stack. A forwarding engine (not shown in FIG. 1) of the packet processor 108a is configured to analyze the header 142 to determine via which port or ports the packet 140 should be egressed. For example, in some embodiments, the forwarding engine of the packet processor 108a uses a portion of the header 142, such as a destination address, to look up in a forwarding database (not shown in FIG. 1) an indication of a port or ports via which the packet 140 is to be egressed.

Figure 2:
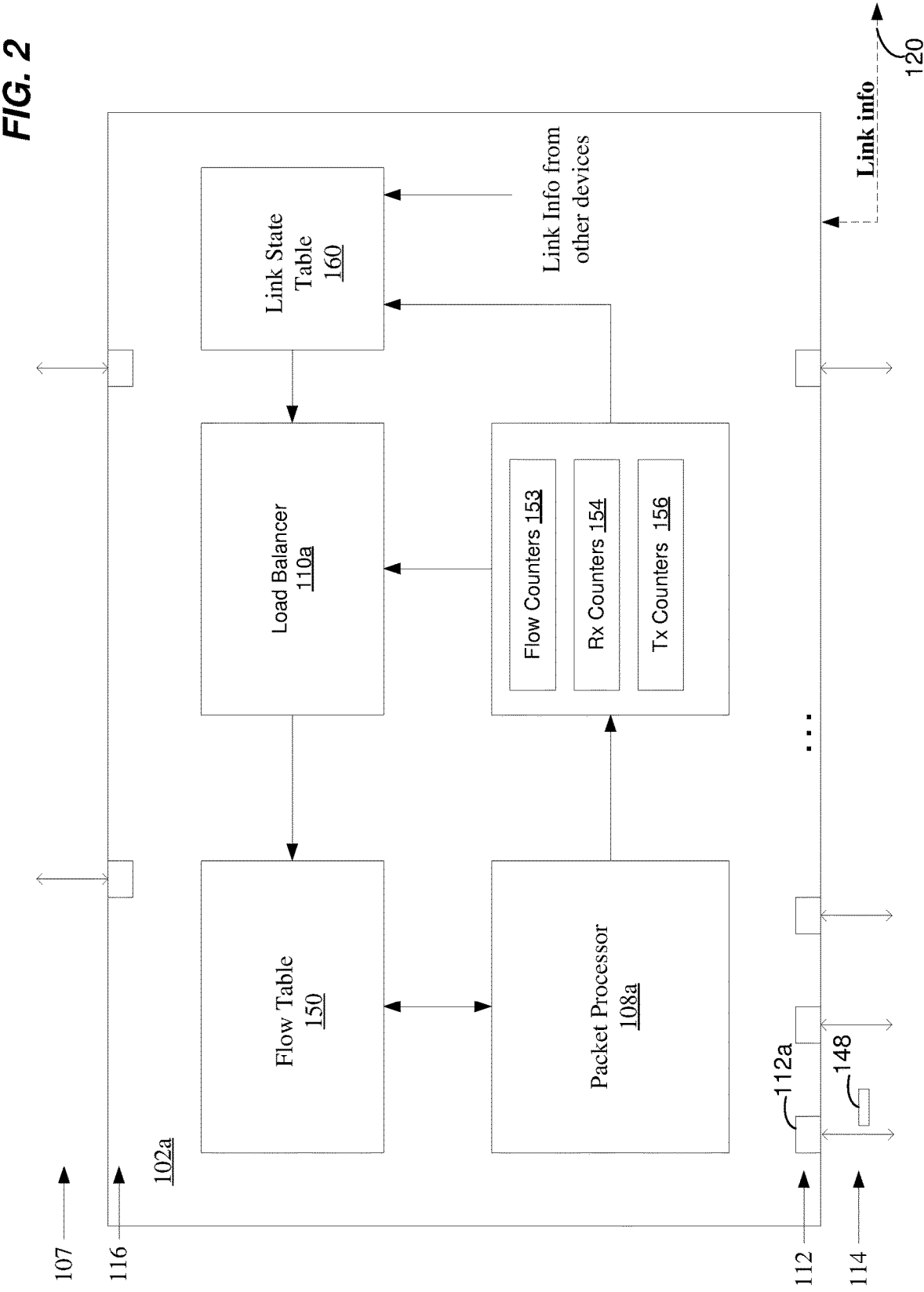
FIG. 2 is block diagram of an example switching device configured to operate in the switching system of FIG. 1, according to an embodiment.

FIG. 2 is block diagram of the example leaf device 102a of FIG. 1 in more detail, according to an embodiment. In an embodiment, each of the leaf devices 102b, 102c is the same as or similar to the leaf device 102a and operates in the manner the same as or similar to the manner described with respect to the leaf device 102. In the embodiment of FIG. 2, the leaf device 102a receives a packet 148 via a downlink port 112a. The packet 148 is the same as or similar to the packet 140 of FIG. 1, in an embodiment. The packet processor 108a of the leaf device 102a determines that the packet 148 is to be transmitted via an uplink port 116 to another leaf device 102 (e.g., the leaf device 102b). In an embodiment, the packet processor 108a determines via which uplink port 116 the packet 148 should be transmitted by accessing a flow table 150. In an embodiment, the packet processor 108a determines via which port 116 the packet 148 should be transmitted towards the leaf device 102b. In an embodiment, the packet processor 108a determines via which port 116 the packet 148 should be transmitted based on a data flow of the packet 148 by accessing a flow table 150. The flow table 150 stores associations between flows of packets and uplink ports 116 that are to be used for transmission of the packets, in an embodiment. The packet processor 108a accesses the flow table 150 using an identifier of the flow of the packet 148 as an index into the flow table 150, in an embodiment. If the flow table 150 includes an entry corresponding to the flow of the packet 148, then the packet processor 108a retrieves, from the entry in the flow table 150 associated with the flow of the packet, an indication of the uplink port 116 via which the packet 148 is to be transmitted. The packet processor 108a then sends the packet 148 to the uplink port 116, identified in the flow table 150, for transmission of the packet 148 via the uplink port 116.

On the other hand, if the flow table 150 does not include an entry corresponding to the flow of the packet 148, this indicates that the packet 148 belongs to a new flow not currently being processed by the leaf device 102a. In this case, the packet processor 108a utilizes a load balancing technique to determine via which uplink port 116 to transmit the packet 148. For example, the packet processor 108a utilizes an equal multi path cost (EMPC) technique to determine via which uplink port 116 to transmit the packet 148, in an embodiment. In this embodiment, the packet processor 108a applies a hash function to one or more fields of a header of the packet 148 and utilizes the result of the hash function to determine the uplink port 116 via which the packet 148 is to be transmitted. In other embodiments, the packet processor 108a uses other suitable load balancing techniques to select an uplink port 116 via which the packet 148 belonging to a new flow is to be transmitted. The packet processor 108a then sends the packet 148 to the determined uplink port 116 for transmission of the packet 148 via the determined port 116. Additionally, the packet processor 108a inserts a new entry into the flow table 150, wherein the new entry associates the flow of the packet 148 with the port 116 determined for the packet 148, to cause transmission of subsequent packets that belong to the same flow to be transmitted via the same port 116, in an embodiment.

With continued reference to FIG. 2, the packet processor 108a is configured to maintain various statistics of packet flows being processed by the leaf device 102a and packets that travel on the links 107 coupled to the ports 116 of the leaf device 102a, in an embodiment. The leaf device 102a includes a links state table 160, in an embodiment. The link state table 160 includes a plurality of entries respectively corresponding to the links 107 $l_1$-$l_6$ used for recording information indicative on amounts of data traveling on the links 107 $l_1$-$l_6$, as described in more detail below, in an embodiment.

In an embodiment, the packet processor 108a is configured to maintain a set of flow counters 153 for assessing bandwidths of flows being processed by the leaf device 102a. In an embodiment, the set flow counters 153 includes respective flow counters associated with packet flows being processed by the leaf device 102a. When the leaf device 102a receives a packet via a port 112a and the packet processor 108a determines a flow of the packet, the packet processor 108a determine whether a counter 153 in the set of flow counters 153 is associated with the flow of the packet. If the packet processor 108a determines that a counter 153 in the set of flow counters 153 is associated with the flow of the packet, the packet processor 108a increments the counter 153 associated with the flow of the packet to account for the packet. On the other hand, if the packet processor 108a determines that no counter 153 in the set of flow counters 153 is associated with the flow of the packet (e.g., if the packet is a first packet of the flow), then the packet processor 108a associates an available flow counter 153 with the flow of the packet and then increments the counter 153 associated with the flow of the packet to account for the packet. In an embodiment, the packet processor 108a increments the counter 153 by an amount corresponding to a length (e.g., a number of bits, a number of bytes, etc.) of the packet. In an alternative embodiment, the packet processor 108a updates flow counter fields in entries of the flow table 150 associated with flows of packets, instead of incrementing flow counters 153, to account for the corresponding packets. The leaf device 102a omits the flow counters 153, in this embodiment.

The packet processor 108a is configured to maintain the flow counts for each given sampling time interval sampling time interval $T_{sam}$, in an embodiment. Upon expiration of the sampling time interval $T_{sam}$, values of the flow counters 153 are recorded in the flow table 150, for example, in an embodiment. For example, the packet processor 108a causes the values of the flow counters 153 to be written in corresponding entries in the flow table 150, in an embodiment. Also upon expiration of each sampling time interval $T_{sam}$, the packet processor 108a flushes (e.g., zeros out) the flow counters 153 or applies a moving average function, such as an exponential moving average (EMA) function to the flow counters 153, and initiates count for the next time interval $T_{sam}$, in various embodiments.

The packet processor 108a is also configured to maintain a set of receive (Rx) counters 154 with respective Rx counters 154 corresponding to respective links 107, or an Rx table with respective entries corresponding to respective links 107, in various embodiments. Thus, for example, with reference to FIG. 1, the Rx counters 154 include two Rx counters 154 including a first Rx counter 154 corresponding to the link $l_1$ and a second Rx counter 154 corresponding to the link $l_2$, in an embodiment. Although Rx counters 154 include two Rx counters 154 corresponding to two links 107 coupled to the leaf device 102a in this example embodiment, the Rx counters 154 include other numbers of Rx counters 154 corresponding to other numbers of links 107 coupled to the leaf device 102a in other embodiments. In operation, each Rx counter 154 maintains a count of data (e.g., number of packets, number of bytes, etc.) received by the leaf device 102a via a corresponding link $l_1$, $l_2$ during a given amount of time corresponding to a sampling interval $T_{sam}$, in an embodiment. For example, the packet processor 108a is configured to update an Rx counter 154 associated with a link 107 each time the leaf device 102a receives a packet via a corresponding uplink port 116 coupled to the link 102, in an embodiment. In an embodiment, the packet processor 108a increments the Rx counter 154 associated with the link 107 by a length (e.g., a number of bits, a number of bytes, etc.) of each packet received by the leaf device 102a via a corresponding port 116 coupled to the link 107, in an embodiment. Upon expiration of the sampling time interval $T_{sam}$, values of the Rx counters 154 are transmitted by the leaf device 102a to another leaf device 102 in the network system 100, in an embodiment. For example, the packet processor 108a of the leaf device 102a causes the control message 120 to be transmitted to another switching device 102, in an embodiment. Also upon expiration of each sampling time interval $T_{sam}$, the packet processor 108a flushes (e.g., zeros out) the Rx counters 154 or applies a moving average function, such as an EMA function to the Rx counters 154, and initiates count for the next time interval $T_{sam}$, in various embodiments.

In an embodiment, the packet processor 108a is configured to send a control message 120 that contains the values of the Rx counters 154 to the other link device 102 in the network system 100. In an embodiment, the packet processor 108a sends such control message 120 to one of the other leaf devices 102 upon expiration of each sampling time interval $T_{sam}$. In an embodiment, the packet processor 108a selects the one other leaf device 102 to which to send a control message 120 upon expiration of a particular sampling interval $T_{sam}$ according to a suitable arbitration scheme, a round robin arbitration scheme. In an embodiment, the control messages 120 are transmitted by the leaf device 102a directly (e.g., via respective direct control links) to the other leaf devices 102. In another embodiment, the control messages 120 are transmitted to the leaf device 102a to the other leaf devices 102 via the network 107 and the spine devices 104.

In an embodiment, the leaf device 102a also receives control messages 120 transmitted, in the same manner, by other leaf devices 102. The control messages 120 that the leaf device 102a receives from the other leaf devices 102 include information measured by the other leaf device 102, in an embodiment. Thus, for example, a control message 120 that the leaf device 102a receives from the leaf device 102b includes information, measured by the leaf device 102b, the information indicative of an amount of data received, in an time period corresponding to the time interval $T_{sam}$, by the leaf device 102b via each of the links $l_3$, $l_4$ coupled to the leaf device 102b. In an embodiment, the information includes values of Rx counters, such as the Rx counters 154, maintained by the leaf device 102b in the manner described above. Similarly, a control message 120 that the leaf device 102a receives from the leaf device 102c includes information, measured by the leaf device 102c, the information indicative of an amount of data received, in an time period corresponding to the time interval $T_{sam}$, by the leaf device 102c via each of the links $l_5$, $l_6$ coupled to the leaf device 102c. The leaf device 102a records the information received in the control messages 120 in a link state table 160, in an embodiment. The arbitration scheme (e.g.,) used by the leaf devices 102 for transmission of the control messages to the other leaf devices 102 ensures coordination among the leaf devices 102 by ensuring that each leaf device 102 obtains the link state information periodically as determined by the arbitration scheme, in an embodiment.

With continued reference to FIG. 2, the packet processor 108a is further configured to maintain a set of transmit (Tx) counters 156, with respective Tx counters 156 corresponding to respective links 107, or a Tx table with respective entries corresponding to respective links 107, in various embodiments. The packet processor 108a is configured to update a Tx counter 156 associated with a link 107 each time the leaf device 102a transmits a packet via a corresponding uplink port 116 coupled to the link 107, in an embodiment. For example, the packet processor 108a is configured to increment the Tx counter 156 associated with the link 107 by a length (e.g., a number of bits, a number of bytes, etc.) of each packet transmitted by the leaf device 102a via a corresponding port 116 coupled to the link 102, in an embodiment. Upon expiration of a sampling time interval $T_{sam}$, values of the Tx counters 156 are recorded in corresponding entries in the link state table 160, in an embodiment. For example, the packet processor 108a of the leaf device 102a causes the values of the Tx counters 156 to be written in corresponding entries in the link state table 160, in an embodiment. Also upon expiration of each sampling time interval $T_{sam}$, the packet processor 108a flushes (e.g., zeros out) the Tx counters 156 or applies a moving average function, such as an EMA function to the TX counters 156, and initiates count for the next time interval $T_{sam}$, in various embodiments.

The load balancer 110a of the leaf device 102a is configured to periodically determine that one or more flows that are currently being transmitted via certain ones of the uplink ports 114 and corresponding links 107 should be moved to other ones of the uplink ports 114 and corresponding other links 107 to improve balancing of flows among the links 107, in an embodiment. When the load balancer 110a determines that one or more flows should be redirected, the load balancer 110a updates corresponding entries in the flow table 150 such that these entries indicate the new ports 114. As a result, subsequent packets corresponding to the flows are sent by the packet processor 108a to the new ports 114 for transmission of the packets via the new ports 114. In an embodiment, the decisions by the dynamic balancer 112*a* involve calculations using link state information obtained by the leaf device 102*a* from the other leaf devices 102 (e.g., the leaf device 102*b* and the leaf device 102*c*) in the network 100 and, additionally, based on link information maintained locally by the leaf device 102*a*. In an embodiment, the load balancer 110*a* performs the following calculation for each data flow being processed by the leaf device 102*a* and for each of k paths between the leaf device 102*a* and the target leaf device 102*b*, 102*c* to which the data flow is directed:

$$F_{share_{L_i \to \{via\ k\} \to L_j}} = \frac{F_{size}}{\max(Rx_{L_j(k)}, Tx_{L_i(k)})} \quad \text{Equation 1}$$

where $$F_{share_{L_i \to \{via\ k\} \to L_j}}$$

is a measure of share of the flow on the path k that includes the links $L_i$ and $L_j$, $F_{size}$ is a size or bandwidth of the flow (e.g., as indicated in the entry in the flow table 150 associated with the flow), $Tx_{L_i(k)}$ is the amount of traffic transmitted by the source leaf device LD1 102*a* on the link $L_i$ (e.g., as indicated in the entry in the link state table 160 associated with the link $L_i$), and $Rx_{L_j(k)}$ is amount of traffic received by the target leaf device via the link $L_j$ (e.g., as indicated in the entry in the link state table 160 associated with the link $L_j$). Thus, for example, referring to FIG. 1, for a flow that is directed from the leaf device LD1 102*a* to the leaf device LD2 102*b* and is currently transmitted to the leaf device LD2 102*b* via the path that includes the link $l_1$ from the leaf device LD1 102*a* to the spine device SD1 104*a* and the link $l_3$ from the spine device SD1 104*a* to the leaf device LD2 102*b* ($l_1$-SD1-$l_3$ path), the load balancer 110*a* of the leaf device LD1 102*a* calculates the share of the flow via the path $l_1$-SD$_1$-$l_3$ by dividing size of the flow (e.g., amount of data corresponding to the flow received in a given amount of time such as packets per second, bytes per second, etc.) by a maximum of (i) the amount of traffic transmitted by the leaf device LD1 102*a* on the path $l_1$ and (ii) the amount of traffic received by the leaf device 102*b* via the path $l_3$. Additionally, the load balancer 110*a* of the leaf device LD1 102*a* calculates potential share of the flow if the flow were transmitted from the leaf device LD1 102*a* to the leaf device 102*b* via the path $l_2$-SD2-$l_4$ by dividing size of the flow by a maximum of (i) the amount of traffic transmitted by the leaf device LD1 102*a* on the path $l_2$ and (ii) the amount of traffic received by the leaf device 102*b* via the path $l_4$. The load balancer 110*a* then calculates a set of gain metrics with respective gain metrics indicating gains in share that the flow would achieve if the flow were redirected from the currently used path ($l_1$-SD1-$l_3$) to the alternative path ($l_2$-SD2-$l_4$), in an embodiment. For example, the load balancer 110*a* calculates the gain by subtracting the calculated share of the flow on the currently used path ($l_1$-SD1-$l_3$) from the calculated potential share of the flow if the flow were transmitted via the path $l_2$-SD2-$l_4$, in an embodiment.

The load balancer 110*a* performs such flow share gain calculations for each flow currently being processed by the leaf device LD1 102*a*, in an embodiment. Accordingly, the load balancer 110*a* calculates, for each flow being processed by the leaf device LD1 102*a*, (i) share of the flow on the path that is currently being used for transmission of the flow to its destination lead device 102, (ii) potential share of the flow on each other path available for transmission of the flow to its destination lead device 102, and (iii) for each of the other paths available for transmission of the flow to its destination lead device 102, gain that the flow would achieve of the flow were moved to the other path available for transmission of the flow to its destination lead device 102. In another embodiment, the load balancer 110*a* performs such flow share calculations for only a subset of the flows currently being processed by the leaf device LD1 102*a*, where the subset does not necessarily include all of the flows currently being processed by the leaf device LD1 102*a*. For example, the load balancer 110*a* performs flow share gain calculations for relatively larger flows, such as for each flow having a size that exceeds a predetermined threshold, in an embodiment. In any event, once the load balancer 110*a* has completed the flow share gain calculations, the load balancer 110*a* identifies m flows having largest flow share gains, where m is an integer, and causes the identified one or more flows to be moved to the paths on which these gains are achieved, in an embodiment. For example, in an embodiment, the load balancer 110*a* updates one or more flow entries, in the flow table 150, corresponding to the identified one or more flows to indicate the alternative paths for the one or more flow to cause subsequent packets that belong to the one or more flow are transmitted via the corresponding alternative paths.

In an embodiment, respective entries in the flow table 150 include respective valid flow indication (e.g., one bit) fields and respective age indication (e.g., one bit) fields. In an embodiment, a valid flow indication in an entry indicates whether the entry is currently valid and should be used for forwarding packets of the corresponding flow. An age field in an entry is used to detect a flowlet or a gap in the corresponding flow, in an embodiment. The age field indicates an amount of time that the entry has not been accessed, in an embodiment. For example, the age field of an entry is reset to zero every time the entry is accessed and is incremented by one on each clock cycle until the next time the entry is accessed, in an embodiment. In an embodiment, when the packet processor 108 determines that a flow should be redirected onto a new path, the packet processor 108 detects a sufficiently large gap in the flow based on the age indication in the entry, in the flow table 150, corresponding to the flow. For example, the packet processor 108 detects a sufficiently large gap if the value of the age fiend exceeds a predetermined threshold, in an embodiment. Upon detecting the gap, the packet processor 150 creates a new entry corresponding to the flow, and indicates the new path (e.g., the port 116 corresponding to the new path) in the new entry such as subsequent packets of the flow are forwarded on the new path, in an embodiment. In an embodiment, the packet processor 108 creates the new entry when the packet processor 108 receives a first packet of a next flowlet of the flow.

In some embodiments, the load balancer 110*a* calculates metrics other than gain metrics and determines paths for flows based on the metrics other than the gain metrics. For example, in an embodiment, the load balancer 110*a* identifies one or more flows that are of relatively large sizes (e.g., largest bandwidth flows), and ensures that these flows are forwarded on paths that are least utilized as indicated by information in the link state table 160, in an embodiment. In some embodiments, the load balancer 110*a* performs the flow share and flow gain calculations only when link utilization, for example as indicated by information in the link state table 160, exceeds a threshold and does not perform these calculations otherwise. In such embodiments, the dynamic balancing of the packet flows is performed by the leaf device 102a only when link utilization is relatively high and is not performed otherwise.

Figure 3:
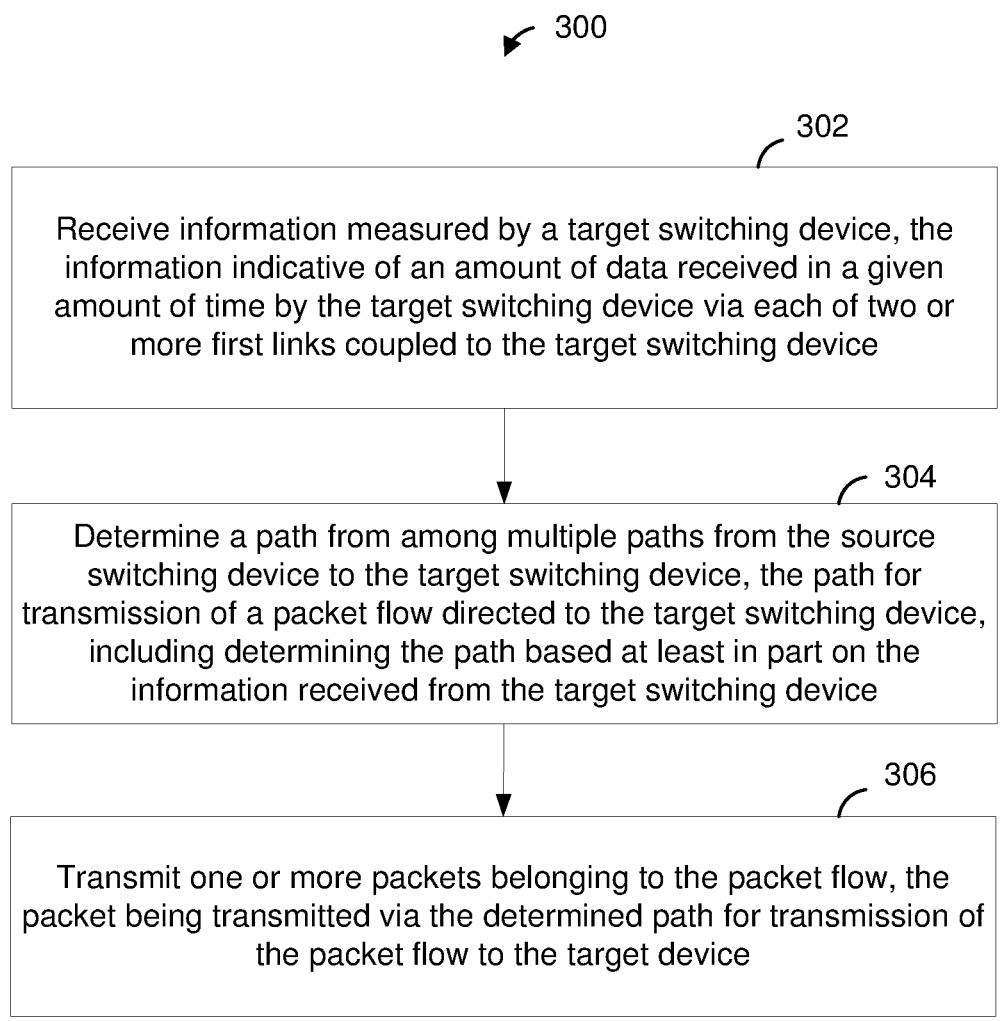
FIG. 3 is a flow diagram of an example method for balancing traffic load, the method implemented by one or more switching device of FIG. 1 and/or the switching device of FIG. 2, according to an embodiment.

FIG. 3 is a flow diagram illustrating an example method 300 for balancing traffic load in a network system, according to an embodiment. In an embodiment, each leaf device 102 of FIG. 1 is configured to implement the method 300. The method 300 is described with reference to the network system 100 and the leaf device 102a of FIG. 1 merely for explanatory purposes. In other embodiments, the method 300 is implemented by suitable network devices different from the leaf device 102 of FIG. 1 and/or is implemented by suitable network devices operating in network systems different from the network system 100 of FIG. 1.

At block 302, the leaf device 102a receives information measured by a target leaf device (e.g., the leaf device 102b). The information is indicative of an amount of data received in a given amount of time by the target leaf device 102b via each of two or more first links coupled to the target switching device 102b. In an embodiment, the information indicative of the amount of data received by the target leaf device 102b via each of the two or more first links (e.g., each of links $l_3$ and $l_4$) coupled to the target leaf device 102b is measured by the target leaf device 102b by counting bits or bytes of data received by the target switching device via each of the links $l_3$ and $l_4$ coupled to the target leaf device 102b. In an embodiment, the information is indicative of total amount of data received by the target leaf device 102b in the given amount of time via each of the links $l_3$ and $l_4$, where the data includes data transmitted by multiple leaf devices (e.g., the leaf device 102a and the leaf device 102c). In an embodiment, the information is included in a control message (e.g., a control message 120) transmitted by the target leaf device 102b to the source leaf device 102a.

At block 304, the source leaf device 102a determines a path from among multiple paths from the source switching device 102a to the target switching device 102b for transmission of a packet flow directed to the target switching device 102b. In an embodiment, the source switching device 102a determines the path at block 304 based at least in part on the information received from the target leaf device 102b at block 302. In an embodiment, the source leaf device 102a determines the path by calculating, based at least in part on information received at block 302, respective flow share metrics for one or more packet flows being processed by the source leaf device 102a, and determines the path based on the flow share metrics. In an embodiment, the leaf device 102a calculates the flow share metrics according to Equation 1 as described above. In another embodiment, the source leaf device 102a calculates the flow share metrics in another suitable manner. In an embodiment, the source leaf device 102a determines the path based on the determining the path based on the flow share metrics such that share of the packet flow on the determined path is greater than share of the packet flow on a path that is currently being used by the source leaf device 102a for transmission of the packet flow.

At block 306, the source switching device 102a transmits one or more packets belonging to the packet flow. In an embodiment, the source switching device 102a transmits the packet at block 306 via the path determined at block 304. In an embodiment, the source switching device 102a determines a link associated with the determined path and transmits the packet via a port coupled to the link such that the packet is transmitted via the determined path.

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

While the present invention has been described with reference to specific examples, which are intended to be illustrative only and not to be limiting of the invention, changes, additions and/or deletions may be made to the disclosed embodiments without departing from the scope of the invention. For example, one or more portions of methods or techniques described above may be performed in a different order (or concurrently) and still achieve desirable results.

What is claimed is:

1. A method for balancing traffic load in a network system that includes at least a first leaf switch device communicatively coupled to one or more second leaf switch devices via one or more spine switch devices, the method comprising:
    receiving, at the first leaf switch device, respective received traffic quantity information measured by the one or more second leaf switch devices;
    for each of multiple paths through the network system, determining, at the first leaf switch device, a respective share of all traffic transmitted via the path corresponding to a particular packet flow being transmitted by the first leaf switch device via the path during a first time interval using received traffic quantity information indicative of a total amount of data received at a respective port of the one or more second leaf switch devices corresponding to the respective path;
    determining, by the first leaf switch device, a path from among multiple paths for transmitting the particular flow during a second time interval using the determined shares for the multiple paths; and
    transmitting, by the first leaf switch device, one or more packets belonging to the particular packet flow via the determined path during the second time interval.

2. The method of claim 1, wherein the multiple paths includes a first path and a second path, wherein the particular traffic flow is actually transmitted by the first leaf switch device via the first path during the first time interval, and wherein determining, for each of the multiple paths, the respective share of all traffic transmitted via the path comprises:
    determining a first share corresponding to the first path using received traffic quantity information that is indicative of a total amount of data that corresponds to i) the particular traffic flow received at a first port of the one or more second leaf switch devices and ii) one or more first other traffic flows received at the first port; and
    determining a second share corresponding to the second path using received traffic quantity information that is indicative of a total amount of data that corresponds to one or more second other traffic flows received at the second port.

3. The method of claim 2, wherein determining the path comprises:
   determining, at the first leaf switch device, a gain metric that indicates a comparison of the first share with the second share; and
   determining the path using at least the gain metric.

4. The method of claim 1, further comprising:
   measuring, at the first leaf switch device, transmitted traffic quantity information that corresponds to the first leaf switch device transmitting the particular traffic flow during the first time interval;
   wherein determining, for each of the multiple paths, the respective share of all traffic transmitted via the path comprises further using the transmitted traffic quantity information corresponding to the particular traffic flow.

5. The method of claim 4, wherein:
   the method further comprises determining, by the first leaf switch device based on the respective share of all traffic transmitted via each of the multiple paths, respective gain metrics that indicate respective potential gains in share of the particular packet flow if the particular packet flow is redirected (i) from the path currently being used by the first leaf switch device for transmission of the particular packet flow to (ii) respective ones of other paths among the multiple paths; and
   determining the path comprises determining the path based at least in part on the respective gain metrics.

6. The method of claim 1, wherein determining, for each of the multiple paths, the respective share of all traffic transmitted via the path corresponding to the particular traffic flow comprises:
   determining, for each of the multiple paths, the respective share of all traffic transmitted via the path corresponding to the particular traffic flow further using a bandwidth of the particular packet flow.

7. The method of claim 1, wherein receiving the respective received traffic quantity information comprises receiving the respective received traffic quantity information in respective control messages transmitted by the respective second leaf switch devices directly to the first leaf switch device.

8. The method of claim 1, wherein receiving the respective received traffic quantity information comprises receiving the respective received traffic quantity information via the one or more spine switch devices.

9. The method of claim 1, wherein transmitting the one or more packets via the determined path comprises transmitting the one or more packets to one of the second leaf target devices via one of the spine switch devices included in the path.

10. A first leaf switch device for operation in a network system, the network system further including one or more spine switch devices that communicatively couple the first leaf switch device with one or more second leaf switch devices, the first leaf switch device comprising:
    a plurality of ports to couple the first leaf switch device to respective links in the network system;
    a packet processor device coupled to the plurality of ports, the packet processor configured to forward packets to the plurality of ports for transmission via the respective links, wherein the packet processor device comprises a load balancer device configured to:
        receiving respective received traffic quantity information measured by the one or more second leaf switch devices for respective ports of the one or more second leaf switch devices,
        for each of multiple paths through the network system, determine a respective share of all traffic transmitted via the path corresponding to a particular packet flow being transmitted by the first leaf switch device via the path during a first time interval using received traffic quantity information indicative of a total amount of data received at a respective port of the one or more second leaf switch devices corresponding to the respective path, and
        determine a path from among the multiple paths for transmitting the particular flow during a second time interval using the determined shares for the multiple paths; and
    wherein the packet processor is configured to forward one or more packets belonging to the particular packet flow via the determined path during the second time interval.

11. The first leaf switch device of claim 10, wherein the multiple paths includes a first path and a second path, wherein the particular traffic flow is actually transmitted by the first leaf switch device via the first path during the first time interval, and wherein the load balancer device is configured to, as part of determining, for each of the multiple paths, the respective share of all traffic transmitted via the path:
    determine a first share corresponding to the first path using received traffic quantity information that is indicative of a total amount of data that corresponds to i) the particular traffic flow received at a first port of the one or more second leaf switch devices and ii) one or more first other traffic flows received at the first port; and
    determine a second share corresponding to the second path using received traffic quantity information that is indicative of a total amount of data that corresponds to one or more second other traffic flows received at the second port.

12. The first leaf switch device of claim 11, wherein the load balancer device is configured to, as part of determining the path:
    determine a gain metric that indicates a comparison of the first share with the second share; and
    determine the path using at least the gain metric.

13. The first leaf switch device of claim 10, wherein:
    the packet processor is configured to measure transmitted traffic quantity information that corresponds to the first leaf switch device transmitting the particular traffic flow during the first time interval;
    the load balancer device is configured to further use the transmitted traffic quantity information corresponding to the particular traffic flow to determine, for each of the multiple paths, the respective share of all traffic transmitted via the path.

14. The first leaf switch device of claim 13, wherein the load balancer device is configured to:
    determine, based on the respective share of all traffic transmitted via each of the multiple paths, respective gain metrics that indicate respective potential gains in share of the particular packet flow if the particular packet flow is redirected (i) from the path currently being used by the first leaf switch device for transmission of the particular packet flow to (ii) respective ones of other paths among the multiple paths; and
    determine the path based at least in part on the respective gain metrics.

15. The first leaf switch device of claim 10, wherein the load balancer device is configured to:

determine, for each of the multiple paths, the respective share of all traffic transmitted via the path corresponding to the particular traffic flow further using a bandwidth of the particular packet flow.

16. The first leaf switch device of claim 10, wherein the load balancer device is configured to:

receive the respective received traffic quantity information in respective control messages transmitted by the respective second leaf switch devices directly to the first leaf switch device.

17. The first leaf switch device of claim 10, wherein the load balancer device is configured to:

receive the respective received traffic quantity information via the one or more spine switch devices.

18. The first leaf switch device of claim 10, wherein the packet processor is configured to forward the one or more packets to one of the second leaf target devices via one of the spine switch devices included in the path.

\* \* \* \* \*